United States Patent [19]
Tamai et al.

[11] 3,943,012
[45] Mar. 9, 1976

[54] MAGNETIC RECORDING MEDIUM

[75] Inventors: Yasuo Tamai; Masashi Aonuma; Matsuaki Nakamura; Hiroshi Agawa; Goro Akashi, all of Odawara, Japan

[73] Assignee: Fuji Photo Film Co., Ltd., Minami-ashigara, Japan

[22] Filed: Aug. 19, 1974

[21] Appl. No.: 498,337

[30] Foreign Application Priority Data
Aug. 18, 1973 Japan............................. 48-92721

[52] U.S. Cl............... 148/105; 75/.5 AA; 148/108; 427/132; 428/432
[51] Int. Cl.²......................................... H01F 1/02
[58] Field of Search................ 148/105, 108, 31.55; 75/.5 AA, .5 AB; 117/235, 236; 427/126, 127, 132; 428/432

[56] References Cited
UNITED STATES PATENTS

| | | | |
|---|---|---|---|
| 3,206,338 | 9/1965 | Miller et al. | 148/105 |
| 3,535,104 | 10/1970 | Little et al. | 148/105 |
| 3,567,525 | 3/1971 | Graham et al. | 75/.5 AA |
| 3,661,556 | 3/1972 | Jolley et al. | 75/.5 AA |
| 3,821,025 | 6/1974 | Akashi et al. | 117/235 |

*Primary Examiner*—Walter R. Satterfield
*Attorney, Agent, or Firm*—Sughrue, Rothwell, Mion, Zinn & Macpeak

[57] ABSTRACT

A magnetic recording medium for high density recording comprising a support having thereon a magnetic recording layer comprising a ferromagnetic metal powder of the Fe-Co-Cr-B system and having a coercive force of about 700 to 500 oersteds in the oriented direction of the magnetic substance and a residual magnetic flux density of about 1500 gausses or more, the residual magnetic flux density of which after storage for 160 hours under the conditions of a temperature of 60°C and 90%RH is 85% or more of the initial value thereof before storage under these conditions in a binder. The magnetic recording medium is especially suitable for high density recording, having sufficient sensitivity and excellent resistance.

5 Claims, 2 Drawing Figures

MAGNETIC RECORDING MEDIUM

BACKGROUND OF THE INVENTION

1. Field of the Invention

This invention relates to magnetic materials for magnetic recording media, such as magnetic recording media for high density recording containing these magnetic materials. In particular, this invention relates to the production of video tapes using ferromagnetic metal powder materials of a novel composition.

2. Description of the Prior Art

Ferromagnetic powder materials heretofore used in video tapes include $\gamma$-$Fe_2O_3$, $Fe_3O_4$, Co-containing $\gamma$-$Fe_2O_3$ and $CrO_2$.

The recording wavelengths in video tapes are far shorter than those of other sound recording tapes, and for example, it is necessary to record short waves of at least up to a minimum wavelength of 6 $\mu$ or so in a VTR (video tape recorder) for television broadcast. The above-described conventional ferromagnetic materials are not as suitable for magnetic recording of recording signals of a short wavelength (of about 10 $\mu$ or less). That is, these ferromagnetic materials have insufficient magnetic characteristics of coercive force (Hc) and residual magnetic flux density for use in high density recording. Miniaturization and simplification of recording and reproducing mechanisms has occurred recently, and development of a small size VTR having a stationary head has been accelerated in this technical field in substitution for conventional rotary head type VTR's. An especially important element in a stationary head VTR is how to reduce the relative velocity between the tape and the head.

More precisely, the minimum recording wavelength is desirably at most 2 $\mu$ or less so as to avoid the high speed conveyance of a video tape in a small size VTR. Recently, extensive development of ferromagnetic powder materials having magnetic characteristics suitable for high density recording has been carried out. One of the subject materials is a ferromagnetic metal powder. The powder is made of a metal or a metal alloy. This powder additionally includes an intermetallic compound. Metals which are mainly used include iron, cobalt and nickel, and other elements such as chromium, manganese, rare earth elements and zinc are optionally added thereto. For preparation of these ferromagnetic materials the following methods are known:

I. A salt of a ferromagnetic metal and an organic acid is pyrolyzed and reduced with a reductive gas, for example, as disclosed in Japanese Patent Publication Nos. 11412/66 and 38417/72.

II. A needle-shaped oxyhydroxide, or a derivative thereof containing other metals, or a needle-shaped iron oxide obtained from these oxyhydroxide substances is reduced, for example, as disclosed in Japanese Patent Publication Nos. 3862/60 and 39477/72 and British Patent No. 1,192,167.

III. A ferromagnetic metal is evaporated in an inert gas, for example, as disclosed in Japanese Patent Publication No. 27718/72 and Ohyo Butsuri (Applied Physics), Vol. 40, No. 1, page 110 (1970).

IV. A metal carbonyl compound is decomposed, for example, as disclosed in U.S. Pat. Nos. 2,983,997 and 3,228,882.

V. A ferromagnetic metal is deposited by electrodeposition using a mercury electrode, and then separated from the mercury, for example, as disclosed in Japanese Patent Publication Nos. 15525/64 and 8123/65.

VI. A salt of a ferromagnetic metal material is reduced in a solution thereof, for example, as disclosed in Japanese Patent Publication Nos. 20520/63, 26555/63, 20116/68 and 41718/72, U.S. Patent Nos. 3,663,318 and 3,661,556 and German Patent Application Laid-Open to Public Inspection OLS No. 2,132,430.

Investigations have revealed that a magnetic recording medium having a ferromagnetic material prepared by the above Method (VI) is relatively free from noise and has better surface characteristics, when used as a video tape, as compared with other tapes having other ferromagnetic materials prepared by other methods.

Accordingly, the ferromagnetic materials used in the present invention are those prepared by Method (VI), and in particular, a borohydride compound or a derivative thereof such as borane, borazane, borohydride, sodium borohydride, potassium borohydride, dimethylaminoborane or diethylaminoborane is used as the reducing agent in Method (VI).

Method (VI) wherein a salt of a ferromagnetic metal material is reduced in a solution thereof with a borohydride compound or a derivative thereof has some defects as described below. The powder obtained according to this method are less resistant to moisture, particularly when iron is present, and are gradually oxidized even at normal temperature, in an extreme case, resulting in a loss of the magnetic characteristics thereof to become consequently a non-magnetic substance. According to this method, furthermore, since the surface activity of the particles obtained is high, the particles are highly active. This high activity is industrially disadvantageous from the standpoint of the production thereof. Use of highly active powders in air is dangerous due to their explosive character. In addition, these powders, when kneaded with a binder, tend to deteriorate the binder used, often resulting in a disadvantage in dispersion and coating. A tape utilizing a magnetic substance obtained in Method (VI) is defective in that, the rubbing of the tape against a video-head at a high relative speed often deteriorates the magnetic material in the tape (presumably the material is oxidized). All of these defects must necessarily be overcome in the development of magnetic recording media for high density recording. However, it has been extremely difficult up to the present to solve all of these problems. For example, it is possible to manufacture magnetic materials capable of having a high Hc and a high squareness ratio, however, it is difficult to manufacture in Method (VI) magnetic materials of a low Hc and a high squareness ratio.

SUMMARY OF THE INVENTION

Accordingly, one object of this invention is to overcome the defects in the prior art and to provide video tapes having sufficient sensitivity and excellent weather-proof properties and being suitable for high density recording.

Another object of this invention is provide magnetic recording media having improved magnetic characteristics.

Still another object is to use moisture-proof and difficultly oxidizable magnetic powder materials in the manufacture of video tapes.

More particularly, this invention provides magnetic recording, medium for high density recording comprising a support having thereon a magnetic recording layer comprising a ferromagnetic metal powder and having a coercive force of about 700 to 1500 Oe in the oriented direction of the ferromagnetic powder, a squareness ratio of about 0.70 to 0.93 and a residual magnetic flux density of about 1500 gausses or more, the residual magnetic flux density of which after storage for 160 hours under conditions of a temperature of 60° C and 90%RH is 85% or more of the initial value thereof before storage, in a binder.

BRIEF DESCRIPTION OF THE ACCOMPANYING DRAWINGS

DETAILED DESCRIPTION OF THE INVENTION

Figure 1:
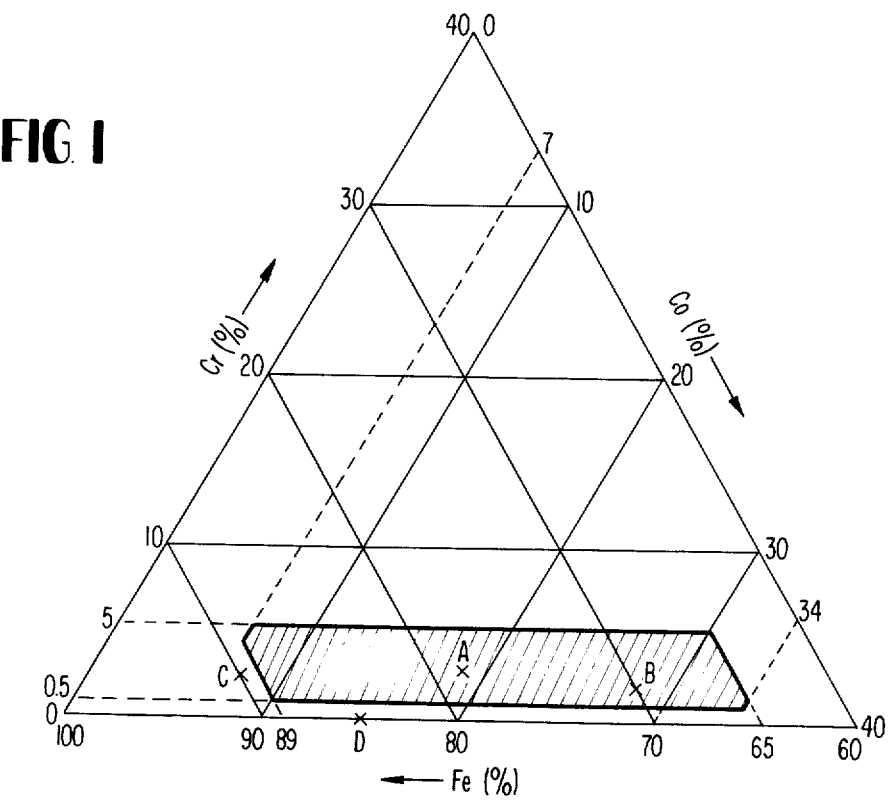
FIG. 1 shows a preferred composition range of the Fe-Co-Cr-ferromagnetic metal powder of this invention.

Those ferromagnetic metal powders of the Fe—Co—Cr—B system are especially preferred for attainment of the above objects of this invention.

Magnetic recording media require a high squareness ratio, a high Hc and a high residual magnetic flux density for retention of sufficient sensitivity. However, an extremely high Hc is inconvenient due to the necessity for the use of a larger amount of electric current for recording and the difficulty in erasure of signals. On these grounds, the Hc is desirably about 1800 Oe or less, more preferably 1500 Oe or less. On the other hand, a degradation of sensitivity due to an increase of self-demagnetization occurs when the Hc is too low. In use of magnetic substances prepared in the above mentioned Method (VI), a decrease in the squareness ratio results from the decrease in the Hc, causing a further decrease of sensitivity. From these results, the lower limit of Hc is found desirably to be about 700 Oe. In this case, the lower limit of the squareness ratio is about 0.70.

In magnetic recording tapes utilizing ferromagnetic powder, the residual magnetic flux density (Br) thereof is generally high because of high saturation magnetization of the magnetic powder itself. A higher residual magnetic flux density is preferable in recording long wavelengths, causing an increase in output in such recording. However, a higher residual magnetic flux density also causes a self-demagnetization, and therefore, the output in recording short wavelengths is not increased thereby. This means that the increase in residual magnetic flux density must necessarily follow the increase in coercive force (Hc) in magnetic recording media suitable for recording short wavelengths. Various kinds of tapes using various kinds of ferromagnetic powder were produced and tested. As a result, it has been found that recording media with less self-demagnetization and sufficient magnetic characteristics of the ferromagnetic metal substance have a Br/Hc value of about 5 or less, preferably 4.5 or less, more preferably 3.8 or less, wherein the coercive force (Hc) is represented in oersteds (Oe) and the residual magnetic flux density (Br) is represented in gausses (G). On the other hand, loss in recording short wavelengths decreases with a reduction in the thickness of the magnetic layer, but in this case, when the Br is too low, the output in recording long wavelengths is insufficient. Therefore, the Br is desirably at least about 1500 gausses or higher, more preferably 2000 gausses or higher. Accordingly, the Br/Hc value in relation to self-demagnetization is desirably about 2 or higher, more preferably 1.5 or higher. Thus, a preferable range for the Br/Hc is 4.5 to 1.5, more preferably 3.8 to 2.0.

It is desirable that the squareness ratio be ideally 1.00. The squareness ratio can be increased by applying a strong orienting magnetic field to the magnetic layer which is not dried. However, application of an extremely strong orienting magnetic field to the magnetic layer after coating with a magnetic coating solution containing the ferromagnetic metal powder results in a degradation of the surface characteristics of the magnetic layer, the so-called orientation chap. Accordingly, a squareness ratio higher than about 0.93 is inconvenient, causing a degradation in sensitivity.

The magnetic recording medium of this invention has excellent weather-resistance. For example, the degree of degradation of the residual magnetic flux density thereof is within 15% in a severe weather-resistance test in which the temperature is 60° C, the relative humidity is 90%RH and the storage time is 160 hours.

A residual magnetic flux density of 1500 gausses or higher before the weather-resistance test is one requisite for magnetic recording media for obtaining a sufficiently high sensitivity, and the excellent weather-resistance thereof is more important. This is because magnetic recording media with poor weather-resistance have defects which are practically fatal in that not only are the recording conditions varied due to deterioration of the medium with the lapse of time but also the reduction in output in reproduction after recording is great.

The importance of a Br degradation within 15% of the original value means not only do the magnetic recording media of the present invention have excellent magnetic characteristics but also these characteristics are essential for retaining as high as possible an output in recording short wavelengths. If the weather-resistance is insufficient and the Br is degraded thereby (for example, degraded to an extent of 25% or more), the resultant reduction in output is unexpectedly high (for example, −3dB). This is considered a characteristic feature of magnetic recording media utilizing a ferromagnetic metal powder. The abnormal reduction of output is similar to the loss resulting from the gap between the surface of the recording medium and the recording and reproducing head. This is considered to mean that the oxidation of magnetic powder in a magnetic layer is greater in the vicinity of the surface of the magnetic layer.

In the magnetic recording media of the present invention, the magnetic layer is desirably thin because the media are used in recording short wavelengths. More particularly, it is important that the thickness of the layer be about 8 $\mu$ or less, desirably 6 $\mu$ or less, more preferably 4.5 $\mu$ or less.

The magnetic material which is used in the present invention is an alloy of the ferromagnetic metals of iron, cobalt and chromium and boron. The boron content in the magnetic substance is about 2 to 10.5% by weight. (All percents are by weight hereinafter, unless otherwise specifically indicated.) The boron component is derived from the borohydride compound. The proportion of the Fe—Co—Cr in the magnetic substance exclusive of the boron is desirably as follows: about 92 to 55%, preferably 89 to 65% Fe; about 5 to 40%, preferably 7 to 34% Co; and about 0.2 to 9%, preferably 0.5 to 5% Cr. If the iron content exceeds the upper limit, the coercive force is reduced and the weather-resistance is degraded. On the contrary, if the iron content is smaller than the lower limit, the saturation magnetization tends to be reduced and the cost of production increases. If the cobalt content exceeds the upper limit, the saturation magnetization tends to be reduced and the cost of product increases. In addition, if the cobalt content is smaller than the lower limit, the coercive force is reduced and the weather-resistance is degraded. If the chromium content exceeds the upper limit, the coercive force is reduced while the squareness ratio is somewhat improved. In addition, if the chromium content is smaller than the lower limit, the weather-resistance is markedly degraded and the squareness ratio also is reduced. The total amount of cobalt and chromium is desirably about 10% or higher on the basis of the total of the ferromagnetic powder substance including all of the metal components and the boron component. If the amount of cobalt and chromium is smaller than about 10%, the weather-resistance is markedly degraded. It would not have been predicted that boron would specifically serve to improve the weather-resistance. The range of the respective components of the magnetic materials of the present invention falls within the shaded area in FIG. 1 attached hereto.

It is well known to add chromium to ferromagnetic metals for improving the weather-resistance thereof. However, in preparing ferromagnetic metals actually using a borohydride compound, the use of chromium requires an extremely delicate control. That is, the magnetic characteristics of the magnetic material obtained abruptly varies, even with a slight change of the amount of the added chromium.

Accordingly, the Hc, squareness ratio (Sq) and saturation magnetization (Bm represented by gauss/cm$^3$) were studied in relation to the sensitivity. As a result, it was found that, with respect to only the saturation magnetization, the use of the data thereof after the weather-resistance test shows the data approximated the sensitivity of the actual media. In the weather-resistance test effective for investigation of magnetic substances, the magnetic material alone is desirably stored for 1 week in a relative humidity of 85%RH at 45°C. Various samples of the Fe—Co—Cr system were tested under these conditions and the sensitivity was determined. The test of the magnetic material alone under this condition corresponds to a test of the tape containing the substance under the conditions of 60°C, 90%RH for 160 hours. From the results of the various tapes tested the range of sufficient sensitivity and excellent weather-resistance is obtained, corresponding to the shaded area of FIG. 1.

This range almost corresponds to that which satisfies the following experimental formula:

$$\frac{3 \log Hc}{500} + \frac{\log Sq}{0.9} + \frac{\log Bm}{5000} > 0.8$$

The formula shows the range capable of imparting a sensitivity higher than that of a standard chromium dioxide tape by about +4dB in a non-bias recording of 5MHz.

The ferromagnetic metal powder materials which are used in this invention are of the Fe—Co—Cr—B system. These substances can optionally contain a small amount of other additives such as rare earth elements and/or Sn, Al, W, Mn, Cu, Zn, Ag, Pd, and/or Ti. These metals are employed in aqueous solutions in the form of chlorides, sulfates, nitrates, formates, acetates, pyrophosphates or sulfamates and the resulting salt solutions are reduced with borohydride compounds.

In the ferromagnetic powder materials of this invention, chromium forms an alloy with iron and cobalt, and the proportion of the respective components present in the alloy formed is different in the central part of the particle from that in the vicinity of the surface of the particle. This has been substantiated from analytical results of particles wherein the ferromagnetic powder particles are packed in a glass tube, hydrochloric acid is gradually introduced into the tube and the solution flowing down the tube is successively analyzed. In this analysis, the amount of chromium in the eluent is larger in the initial stage of the analysis than that in the latter stage of the analysis. Although it is not completely clear since the particles are so fine, it was observed that the chromium concentration in the alloy in the vicinity of the central part of the particle was about 80 to 50% of that in the vicinity of the surface part of the particle.

The metal salt solution can contain, if desired, additional additives such as chelating agents pH buffers and/or pH adjusting agents, in addition to the above described components.

These chelating agents are water-soluble and form a complex ion with the hereinbefore described metal ions and include monocarboxylic acids such as formic acid, acetic acid, propionic acid, butyric acid, valeric acid, acrylic acid, trimethylacetic acid, benzoic acid or chloroacetic acid or the salts thereof (as pH buffers and complex forming agents); dicarboxylic acids such as oxalic acid, succinic acid, malonic acid, maleic acid, itaconic acid or p-phthalic acid or the salts thereof and oxycarboxylic acids such as glycolic acid, lactic acid, salicylic acid, tartaric acid or citric acid or the salts thereof; The pH buffering agents are water-soluble and include boric acid, carbonic acid or sulfurous acid (as pH adjusting agents and pH buffers); and pH adjusting agents such as inorganic acids or organic acids, ammonium or alkali metal hydroxides. These additives can be present in an amount of less than about 20% by weight, preferably less than about 12% by weight.

The above-described additives not only have their individual function but in some instances have more than are function. For example, some compounds act not only as a complex forming agent but also as a pH buffer.

Further, to the reaction solution there can be added as desired a soluble protein together with a proteolytic enzyme, a carbohydrate together with a carbohydrate decomposer, and an organic solvent, e.g., in an amount of less than about 12% by weight, preferably less than 6% by weight.

Suitable soluble proteins include simple proteins which decompose into chiefly amino acids upon hydrolysis, conjugated proteins comprising polypeptide chains connected to other compounds, derived proteins which have been modified by various physical, thermal, photochemical or chemical procedures, etc. They are all composed of macromolecules of polypeptides, comprising amino acids, having a molecular weight of from about 10,000 to about 5,000,000.

Simple proteins suited for the present invention include albumins such as egg albumin, blood serum albumin, lactoalbumin, etc., globulins such as serum globulin, lactoglobulin, myosin, edestin, ammandin, legumin, etc., glutelins such as glutenin, hordenin, oryzenin, etc., prolamins such as gliadin, hordein, zein, etc., albuminoids such as collagen, elastin, keratin, fibroin, etc., histones such as thymus-histone, liver-histone, scombrone, etc., and protamines such as salmine, clupeine, strurine, iridine, etc.

Conjugated proteins include chromoproteins, phosphoproteins, metalloproteins lipoproteins, glycoproteins, nucleoproteins, etc. Examples of chromoproteins are hemoproteins such as hemoglobin, myoglobin, cytochrome, catalase, peroxydaze, etc., chlorophyll proteins such as chlorophylin; carotinoid proteins such as rhodopsin, etc., flavoproteins such as flavin mononucleotide, flavin adeninedinucleotide, etc. Phosphoproteins include casein, hyderin, apoferritin, etc. Metalloproteins include iron proteins such as ferritin, apoferritin, etc., copper proteins such as hemocyanine, etc., zinc proteins; manganese proteins, etc. Lipoproteins include thromblplastein, $\alpha_1$-lipoprotein, $\alpha_2$-lipoprotein, lipobilitein, lipotenilin, etc., glucoproteins include mucin, celluloplasmin, siderophilin, fibrin, prothrombin collagen, enterokinase, haptoglobin, mucoid, etc., and nucleoproteins include nucleic acids, deoxypentose-nucleoprotein, pentose-nucleoprotein, viruses, bacteriophages, etc.

Derived proteins include gelatin modified protein, proteans, proteoses, peptones, polypeptides, metaproteins, etc.

These proteins can be used individually or in combination.

To decompose any of these proteins, proteases belonging to the hydrolase type, can be employed, including pepsin, trypsin, chymotrypsin, cathepsin, rennin, papain, promelin, ficin, thrombin, enteropeptidase, plasmin, mold protease, yeast protease, bacterium protease, etc. Such proteolytic enzymes can be used individually or in combination.

Carbohydrates comprise monosaccharides, oligosaccharides such as di-, tri- or tetrasaccharides and polysaccharides.

Monosaccharides includes polyhydric alcohols containing aldehyde groups (aldoses) and those containing keto groups (ketoses).

Oligosaccharides comprise dimers, trimers or tetramers of monosaccharides, each of which may be common or different, through glycoside linkages. Polysaccharides are polymers of mono- or oligosaccharides.

Suitable monosaccharides include glycol aldehydes which is the aldose of a diose ($C_2H_4O_2$), a triose ($C_2H_6O_3$) such as glyceraldehyde (aldose) or dihydroxyacetone (ketose), etc. a tetrose ($C_4H_8O_4$) such as erythrose (aldose), erythrulose (ketose), etc., a pentose ($C_5H_{10}O_5$) such as ribose, xylose, arabinose (aldose), arabinulose (ketose), xylulose (ketose), etc. a hexose ($C_6H_{12}O_6$) such as D-glucose, mannose, galactose (aldose), D-fructose, sorbose (ketose), and a heptose ($C_7H_{14}O_7$) such as mannoheptose, which is an aldose, or heptulose which is a ketose.

Oligosaccharides, include disaccharides such as lactose (comprising D-glucose and D-galactose), maltose (comprising two moles of D-glucose), sucrose (comprising D-glucose and D-fructose), trehalose (comprising D-glucose); trisaccharides such as raffinose (comprising D-glucose, D-fructose and D-galactose), gentianose (comprising D-fructose and two molecules of D-glucose), mannotriose (the trimer of mannose), etc.; and tetrasaccharides such as stachyose (comprising two molecules of D-galactose, D-glucose and D-fructose), etc.

Polysaccharides which can be used for the present invention include dextrin (D-glucose), starch (D-glucose), glycogen (D-glucose), cellulose (d-glucose), inulin (fructose), mannan (mannose), araban (arabinose), xylan (xylose), dextran (D-glucose), galactan galactose), gum arabic (comprising galactose, glucuronic acid, hexose and methylpentose), etc.

As is clear from the above expalanations, suitable carbohydrates for the present invention are monosaccharides and polysaccharides comprising a multiplicity of monosaccharides connected by glycoside linkages. Further, as the enzyme to decompose such a carbohydrate, a hydrolase such as $\alpha$-amylase (diastase), $\beta$-amylase (diastase), cellulase, lichenase, laminarinase, inulase, $\alpha$-glucosidase, $\beta$-glucosidase, $\alpha$-galactosidase, $\beta$-mannosidase, etc., all of which are glycosidases, can be used.

An inorganic acid such as hydrogen chloride, sulfuric acid, nitric acid, etc. can also be used to decompose carbohydrates.

Use of ultrasonic waves in the reduction is effective to improve the characteristics of the resulting magnetic powder material. In addition, it also is effective to carry out the reduction reaction in a magnetic field of several tens of Oe or more for the purpose of increasing the coercive force and the squareness ratio of the resulting magnetic materials. The strength of the magnetic field is preferably about 500 to 3000 Oe, and the stronger the field the better. In the reduction reaction wherein a borohydride compound is used as the reducing agent, the temperature in the reaction solution is desirably about 65° C or below, e.g., from about $-10°$ C to about 65° C. Use of a temperature above 65° C deteriorates the character of the ferromagnetic powder obtained and use of a temperature less than $-10°$ C results in a slow reaction rate and the solution tends to freeze.

The metal ion concentration desirably ranges from about 0.002 to 2 moles/liter, more preferably 0.01 to 0.5 mole/liter.

The concentration of the borohydride compound or derivative thereof to be used as the reducing agent desirably ranges from about 0.0001 to 15 mol/liter, preferably 0.0002 to 10 moles/liter, and the reducing agent/metal ion molar ratio desirably ranges from about 0.1:1 to 5:1, preferably 0.25:1 to 4:1.

The borohydride compound or the derivative thereof is dissolved in water, methanol or a like solvent, preferably water, when used, and it is preferred that hydroxide ion be present in the solution. In this case, the amount of the hydroxide ion affects the weather-resistance of the formed magnetic material. More precisely, when the concentration of the hydroxide ion is in the range of about 0.001N to 0.6N, the weather-resistance of the magnetic substance formed is high. Suitable alkaline materials which can be used to obtain this hydroxide concentration are water soluble, produce hydroxide ions in solution and are capable of generating a pH of higher than about 8. Preferred inorganic hydroxides are the hydroxides of Group I and Group II elements such as sodium hydroxide, potassium hydroxide, barium hydroxide and calcium hydroxide, and suitable examples of organic alkaline materials include n-butylamine, isopropylamine, hydrazine, etc.

Suitable reducing agents include borohydrides and derivatives thereof such as borane, borazane, borohydride, sodium borohydride, potassium borohydride, dimethylaminoborane, diethylaminoborane, etc. These reducing agents can be used individually or in combination. These compounds are compounds which contain boron and are water-soluble. Upon reaction hydrogen and boron metal are produced. Suitable chromium salts which can be present in the solution during reduction include chromium chloride, chromium sulfate, chromium nitrate, etc., chromates, dichromates, etc.

Observation has revealed that ferromagnetic powders obtained in the method of this invention as described above are granular, each having a particle size of about 50 to 1000 A, and that several or several tens or more of the respective particles are linked together to form a string-like, rod-like or necklace-like form.

Heating the ferromagnetic powders obtained in the present invention for about 15 seconds to about 120 hours, preferably 3 minutes to 24 hours, at a temperature of about 120° C to 450° C, preferably 150° C to 370° C, in a non-oxidizing atmosphere or in the presence of a slight amount of water or $O_2$, further improves the magnetic characteristics of the powders obtained in the present invention. Suitable non-oxidizing atmospheres include inert gases such as helium, neon, argon, krypton, xenon, etc., and gases such as nitrogen, carbon monoxide, carbon dioxide, etc. Where oxygen is present a suitable oxygen concentration is less than about 50 mmHg, preferably less than 20 mmHg, and a suitable amount of water is a relative humidity of less than 10%.

The ferromagnetic materials obtained in the present invention contain a slight amount of boron. The boron component is believed to result from the borohydride compound which is used as one of the starting materials. The boron content was found to range from about 2.0 to 10.5% by weight.

The ferromagnetic powder materials obtained in this invention are used for the production of magnetic recording media in combination with various other materials.

Binders which can be used together with the ferromagnetic powder materials of the present invention include conventional thermoplastic resins and thermosetting resins. These resins can be used individually or in the form of a mixture.

Thermoplastic resins are those having a softening point of about 150° C or below, an average molecular weight of about 10,000 to 200,000, and a polymerization degree of about 200 to 1,000 or so, and representative examples thereof are vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, polyvinyl fluorides, vinylidene chloride-acrylonitrile copolymers, butadiene-acrylonitrile copolymers, polyamide resins, polyvinyl butyral resins, cellulose derivatives (such as cellulose acetate butyrate, cellulose diacetate, cellulose triacetate, cellulose propionate and nitrocellulose), styrenebutadiene copolymers, polyester resins, chlorovinyletheracrylate copolymers, amino resins and various kinds of synthetic rubber type thermoplastic resins. These resins can be used individually or in the form of a mixture thereof. These resins are disclosed in Japanese Patent Publication Nos. 6877/62, 12528/64, 19282/64, 5349/65, 20907/65, 9463/66, 14059/66, 16985/66, 6428/67, 11612/67, 4623/68, 15206/68, 2889/69, 17947/69, 14020/70, 14500/70, 18573/72, 22063/72, 22064/72, 22068/72, 22069/72, 22070/72 and 22886/72, and U.S. Pat. Nos. 3,144,352, 3,419,420, 3,499,789 and 3,713,887, etc.

Thermosetting resins are those having a molecular weight of about 200,000 or less in the form of a coating solution, and when heated, after being coated and dried, the molecular weight thereof beomes infinitely large to condensation or addition reactions. Preferred resins are those which neither soften nor melt below the decomposition point of the resin. Examples of preferred resins are phenol resins, epoxy resins, polyurethane setting resins, urea resins, melamine resins, alkyd resins, silicone resins, reactive acrylic resins, epoxy-polyamide resins, nitro cellulose-melamine resins, mixtures of a high molecular weight polyester resin and an isocyanate prepolymer, mixtures of a methacrylate copolymer and a diisocyanate prepolymer, mixtures of a polyester-polyol and a polyisocyanate, urea-formaldehyde resins, mixtures of low molecular weight glycol/high molecular weight diol/triphenylmethane-triisocyanate, polyamine resins and mixtures thereof.

These resins are disclosed in Japanese Patent Publication Nos. 8103/64, 9779/65, 7192/66, 8016/66, 14275/66, 18179/67, 12081/68, 28023/69, 14501/70, 24902/70, 13103/71, 22065/72, 22066/72, 22067/72, 22072/72, 22073/72, 28045/72, 28048/72 and 28922/72, and U.S. Pat. Nos. 3,144,353, 3,320,090, 3,437,510, 3,597,273, 3,781,210 and 3,781,211, etc.

One or more of these binders are used, and other additives can be added thereto. The proportion of ferromagnetic powder material to binder is about 100 parts by weight of the ferromagnetic substance to 10 to 200 parts by weight, preferably 25 to 120 parts by weight, of the binder.

Suitable additives includes dispersing agents, lubricants and abrasives.

Examples of dispersing agents are fatty acids ($R_1COOH$ where $R_1$ represents an alkyl group having about 11 to 17 carbon atoms) such as caprylic acid, capric acid, lauric acid, myristic acid, palmitic acid, stearic acid, oleic acid, elaidic acid, linoleic acid, linolenic acid, and stearolic acid; fatty acid esters ($R_2COOR_3$ where $R_2$ and $R_3$ each represents an alkyl group having about 1 to 12 carbon atoms) such as ethyl caprylate and propyl laurate; metallic soaps of the above described fatty acids and alkali metals (such as Li, Na, K) or alkaline earth metals (such as Mg, Ca, Ba); and lecithins. In addition, higher alcohols having about 12 to 24 carbon atoms such as lauryl alcohol, pentadecyl alcohol, cetyl alcohol, stearyl alcohol, nonadecyl alcohol, etc., and the sulfates thereof can also be used. The amount of the dispersing agent present is about 1 to 20 parts by weight on the basis of 100 parts by weight of binder.

Examples of the lubricants which can be used are silicone oil, graphite, molybdenum disulfide, tungsten disulfide, fatty acid esters of a monobasic fatty acid having about 12 to 16 carbon atoms and a monohydric alcohol having about 3 to 12 carbon atoms, and fatty acid esters of a monobasic fatty acid having about 17 or more carbon atoms and a monohydric alcohol, the number of carbon atoms of the acid and the alcohol being about 15 to 28 in total. Suitable examples of fatty acid esters include ethyl caprylate, ethyl laurate, propyl myristate, methyl palmitate, ethyl stearate, amyl stearate, ethyl behenate, ethyl oleate, propyl linolate, methyl linolenate, etc. The amount of the lubricant present is about 0.2 to 20 parts by weight on the basis of 100 parts by weight of the binder. These lubricants are disclosed in Japanese Patent Publication Nos. 23889/68, 28647/67 and 81543/68, U.S. Pat. Nos. 3,470,021, 3,492,235, 3,497,411, 3,523,086, 3,625,760, 3,630,772, 3,634,253, 3,647,539 and 3,687,725, *IBM Technical Disclosure Bulletiz*, Vol. 9, No. 7, page 779, December 1966, and *ELEKTRONIK* 1961, No. 12, page 380, etc.

Examples of abrasives include conventional materials such as alumina, fused alumina, silicon carbide, chromium oxide, corundum, synthetic corundum, diamond, synthetic diamond, garnet and emery (main components: corundum and magnetite). These abrasives have an average particle size of about 0.05 to 5 $\mu$ (diameter), preferably 0.1 to 2 $\mu$. The amount of the abrasive present is 7 to 20 parts by weight on the basis of 100 parts of binder. These abrasives are disclosed in Japanese Patent Application No. 26749/73, U.S Pat. Nos. 3,007,807, 3,041,196, 3,293,066, 3,630,910 and 3,687,725; British Pat. No. 1,145,349 and German Pat. No. 853,211, etc.

The formation of the magnetic recording layer is carried out by dissolving the above described components in an organic solvent and coating the resulting coating solution on a support. The thickness of the support is suitably about 5 to 50 $\mu$ or so, preferably 10 to 40 $\mu$ or so, and suitable examples of supports, are, for example, polyesters such as polyethylene terephthalate, polyolefins such as polypropylene, cellulose derivatives such as cellulose triacetate or cellulose diacetate and polycarbonates.

Coating of the above-described magnetic recording layer on a support can be carried out by various methods such as airdoctor coating, blade coating, air-knife coating, squeeze coating, dip coating, reverse-roll coating, transfer-roll coating, gravure coating, kiss coating, cast coating and spray coating, and other means can also be utilized therefor. These coating means are described in detail *Coating Engineering* (pp. 253–277), Asakura Publishing Co., March 20, 1971. A suitable coating composition concentration can range from about 150 to 500 g, preferably 200 to 450 g, per kg of the solvent.

Representative examples of organic solvents which can be used in coating the magnetic recording layer on a support are ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate, glycol acetate monoethylether; ethers and glycol ethers such as diethyl ether, glycoldimethylether, glycolmonoethylether dioxane and tetrahydrofuran; aromatic hydrocarbons such as benzene, toluene, and xylene; chlorinated hydrocarbons such as methylene chloride, ethylene chloride, carbontetrachloride, chloroform, ethylene-chlorohydrin and dichlorobenzene; and dimethylsulfoxide and dimethylformamide.

The present invention is explained in greater detail by reference to the following Examples and Comparative Examples. One skilled in the art can easily understand that the components, proportion and operational procedure as shown herein can be varied as long as these are within the present invention. Accordingly, this invention is not to be interpreted as being limited to the illustrated Examples only. All parts and percents are by weight unless otherwise specifically indicated.

EXAMPLE 1

A direct current magnetic field of 500 Oe was applied to 100 liters of an aqueous solution of ferrous chloride, cobalt chloride and chromium alum, these components being dissolved in a predetermined proportion, and the solution was kept at 20° C. 20 liters of sodium borohydride solution were added to the above metal salt solution at a rate of 1.2 liter/sec. The concentration of the metal salt was 0.2 mole/liter total, and the concentration of the sodium borohydride solution was 2 moles/liter. This solution had a sodium hydroxide concentration of 0.06N. The reaction started simultaneously with the addition of the reducing agent, and vigorous foaming was noticed. After the reaction, the black precipitate obtained was fully washed with water and then with acetone. Afterwards, the precipitate was dried at 25° C in an atmosphere of a humidity of 30% or less.

The analysis results of the metal components and the boron in the respective samples prepared are shown in the following Table 1.

Table 1 (%)

| Sample | Fe | Co | Cr | B |
|---|---|---|---|---|
| A | 74.0 | 17.3 | 2.3 | 6.4 |
| B | 65.7 | 26.3 | 1.8 | 6.2 |
| C | 83.9 | 7.5 | 1.9 | 6.7 |
| D | 90.3 | 13.9 | 0.0 | 5.8 |

The following Table 2 shows the saturation magnetization (magnetic field: 2000 Oe) of these samples before and after weather-resistance testing.

Table 2 (T)

| Sample | Initial Value | After Weather-Resistance Testing* |
|---|---|---|
| A | 8650 | 7800 |
| B | 8400 | 7950 |
| C | 9290 | 4240 |
| D | 8700 | 4080 |

(*stored for one week at 45°C, 85%RH)

Both Samples A and B of the present invention have an original saturation magnetization value (before weather-resistance testing) somewhat lower than that of the other Samples C and D, while after the weather-resistance testing the Samples A and B show a saturation magnetization value far higher than that of the Samples C and D.

Magnetic coating compositions of the following ingredients and these four samples were prepared.

| | parts |
|---|---|
| Ferromagnetic Powder (average particle size of about 0.25 $\mu$ in length and 0.04 $\mu$ in width) | 300 |
| Polyester-polyol* | 40 |
| Cellulose Acetate Butyrate | 25 |
| Polyisocyanate Compound** | 20 |
| Chromium Sesquioxide (average particle size: about 0.1 $\mu$) | 4 |
| Soybean Lecithin | 6 |
| Methyl Ethyl Ketone | 400 |
| Butyl Acetate | 500 |

*Condensate of adipic acid and butanediol, having terminal hydroxy groups and a molecular weight of about 1800

**Desmodur L; trade name, produced by Bayer AG; 75 wt.% ethylacetate solution; adduct 3 moles of toluenediisocyanate and 1 mole of trimethylol propane.

Each of the resulting coating compositions was applied to one surface of a polyethyleneterephthalate film (thickness: 25 $\mu$) in a magnetic field and heated and dried to form a layer having a thickness of 4.5 $\mu$. The thus obtained magnetic web was treated with a super calender and slit to form a video tape having a width of ½ inch. The magnetic characteristics of the tapes obtained are shown in the following Table 3.

Table 3

| Sample | Magnetic Substance | Hc (Oe) | Square-ness Ratio | Residual Magnetic Flux Density* (G) Initial Value | After Weather-Resistance Testing | Sensitivity** (dB) |
| --- | --- | --- | --- | --- | --- | --- |
| No. 1 | A | 980 | 0.85 | 1900 | 1630 | +1.6 |
| No. 2 | B | 1070 | 0.86 | 1820 | 1660 | +2.0 |
| No. 3 | C | 720 | 0.82 | 2010 | 1305 | −1.3 |
| No. 4 | D | 970 | 0.85 | 1970 | 1070 | 0.0 |

*Stored for 160 hours at 60°C, 90%RH
**After weather-resistance testing, non-bias recording of 5MHz, with No. 4 as standard.

FIG. 1 shows a preferred composition range of the Fe—Co—Cr system of this invention. The preferred range is the shaded portion in FIG. 1. (This ternary figure only shows the three components of Fe, Co and Cr contained in the samples, and the boron component therein is not shown.) The respective Samples A, B, C and D are plotted in FIG. 1 with respect to their Fe—Co—Cr composition.

Figure 2:
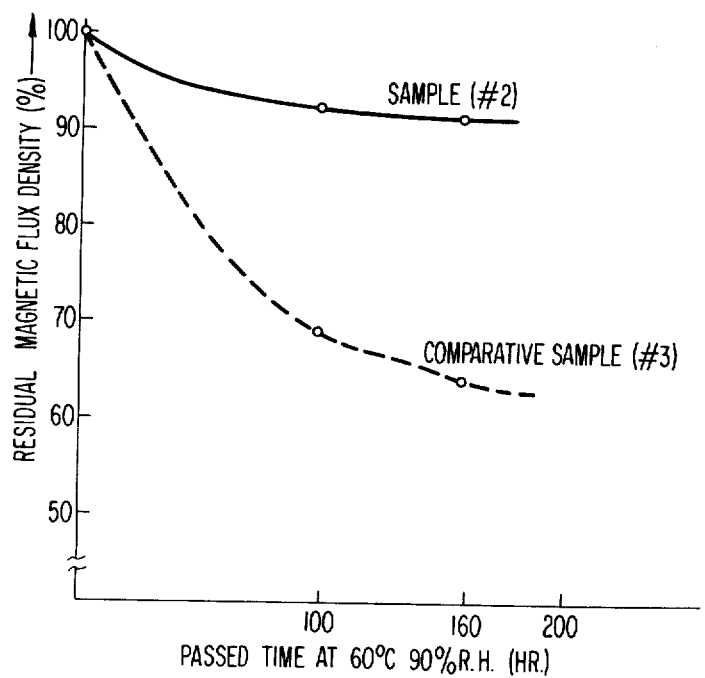
FIG. 2 shows the variation in residual magnetic flux density for samples of the invention and comparative samples during weather resistance testing.

FIG. 2 shows the variation in residual magnetic flux density of Samples No. 2 (present invention) and No. 3 (comparative sample) in weather-resistance testing.

From the above results, it is apparent that the magnetic recording tapes A and B of this invention have more excellent weather-resistance than other conventional tapes.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support having thereon a magnetic recording layer comprising a binder and a ferromagnetic alloy powder, said magnetic recording layer having a coercive force of about 700 to 1500 oersteds in the oriented direction of the ferromagnetic powder and a residual magnetic flux density of about 1500 gausses or higher, the residual magnetic flux density of which after storage for 160 hours in an atomosphere of 60° C and 90% RH is 85% or higher of the initial value thereof before said storage, and said ferromagnetic alloy powder comprising the reaction product of reducing a mixed solution containing Fe, Co and Cr ions with a borohydride compound reducing agent, said mixed solution containing metal ions ranging from 0.01 to 0.5 mole/liter in concentration, such that said ferromagnetic alloy powder comprises about 65 to 89% Fe, about 7 to 34% Co, and about 0.5 to 5% Cr, said percentages being by weight.

2. The magnetic recording medium claimed in claim 1, wherein the borohydride compound is in a solution having a hydroxide ion concentration of about 0.001N to 0.6N.

3. The magnetic recording medium as claimed in claim 1, wherein Br/Hc of the ferromagnetic metal powder is about 1.5 to 4.5, in which Hc is the coercive force in oersteds and Br is the residual magnetic flux density in gausses.

4. The magnetic recording medium as claimed in claim 3, wherein the Br/Hc is 3.8 to 2.0.

5. The magnetic recording medium as claimed in claim 1 wherein the proportion of the respective metal components is within the range of the cross-hatched portion in FIG. 1.

* * * * *